US012627586B2

(12) United States Patent
Bothe et al.

(10) Patent No.: US 12,627,586 B2
(45) Date of Patent: May 12, 2026

(54) PROXIED TESTING AND STITCHING OF RESULTS FOR REDUCED TRAFFIC SYNTHETIC TESTING

(71) Applicant: Palo Alto Networks, Inc., Santa Clara, CA (US)

(72) Inventors: John Edward Bothe, Mount Eliza (AU); Hristos Siakou, Ivanhoe East (AU)

(73) Assignee: Palo Alto Networks, Inc., Santa Clara, CA (US)

( * ) Notice: Subject to any disclaimer, the term of this patent is extended or adjusted under 35 U.S.C. 154(b) by 374 days.

(21) Appl. No.: 18/341,926

(22) Filed: Jun. 27, 2023

(65) Prior Publication Data

US 2025/0007813 A1 Jan. 2, 2025

(51) Int. Cl.
*H04L 43/50* (2022.01)
*H04L 43/087* (2022.01)
*H04L 43/10* (2022.01)

(52) U.S. Cl.
CPC ............ *H04L 43/50* (2013.01); *H04L 43/087* (2013.01); *H04L 43/10* (2013.01)

(58) Field of Classification Search
CPC ....... H04L 43/50; H04L 43/087; H04L 43/10; H04L 43/0829; H04L 43/0852; H04L 43/12
See application file for complete search history.

(56) References Cited

U.S. PATENT DOCUMENTS

| | | | |
|---|---|---|---|
| 10,834,265 B1 * | 11/2020 | Antunes | H04L 65/80 |
| 10,892,964 B2 | 1/2021 | Sharma et al. | |
| 2010/0077365 A1 * | 3/2010 | Shulmister, Jr. | H04L 43/50 |
| | | | 716/106 |
| 2017/0005887 A1 | 1/2017 | Lad et al. | |
| 2020/0204448 A1 * | 6/2020 | Nataraj | H04L 41/12 |
| 2020/0213210 A1 * | 7/2020 | Dam | H04L 43/045 |
| 2023/0033521 A1 * | 2/2023 | Oliveira | H04L 43/045 |
| 2023/0246927 A1 * | 8/2023 | Siakou | H04L 41/046 |
| | | | 709/223 |
| 2024/0406095 A1 * | 12/2024 | Mermoud | H04L 45/70 |
| 2025/0023797 A1 * | 1/2025 | Oliveira | H04L 41/5058 |

FOREIGN PATENT DOCUMENTS

WO WO-2023009851 A1 * 2/2023 ............. H04L 41/12

* cited by examiner

*Primary Examiner* — Abdullahi E Salad
(74) *Attorney, Agent, or Firm* — Gilliam IP PLLC

(57) ABSTRACT

Application and network tests executed for paths between endpoints and an application are proxied to reduce network traffic sent to application as part of synthetic testing. Testing for each endpoint behind a network element or security component acting as a test proxy for a path between the endpoint to the application is split into two segments: a segment from each endpoint to the test proxy, and a segment from the test proxy to the application. A service obtains test results from agents executing on the endpoints and the test proxy and "stitches" the results of each segment together to generate test results for the path from endpoint to application. Stitching refers to aggregating, combining, or otherwise joining the results obtained for each path segment to generate a set of test results for the path. The manner of stitching can vary depending on test type and/or types of performance metrics collected.

20 Claims, 7 Drawing Sheets

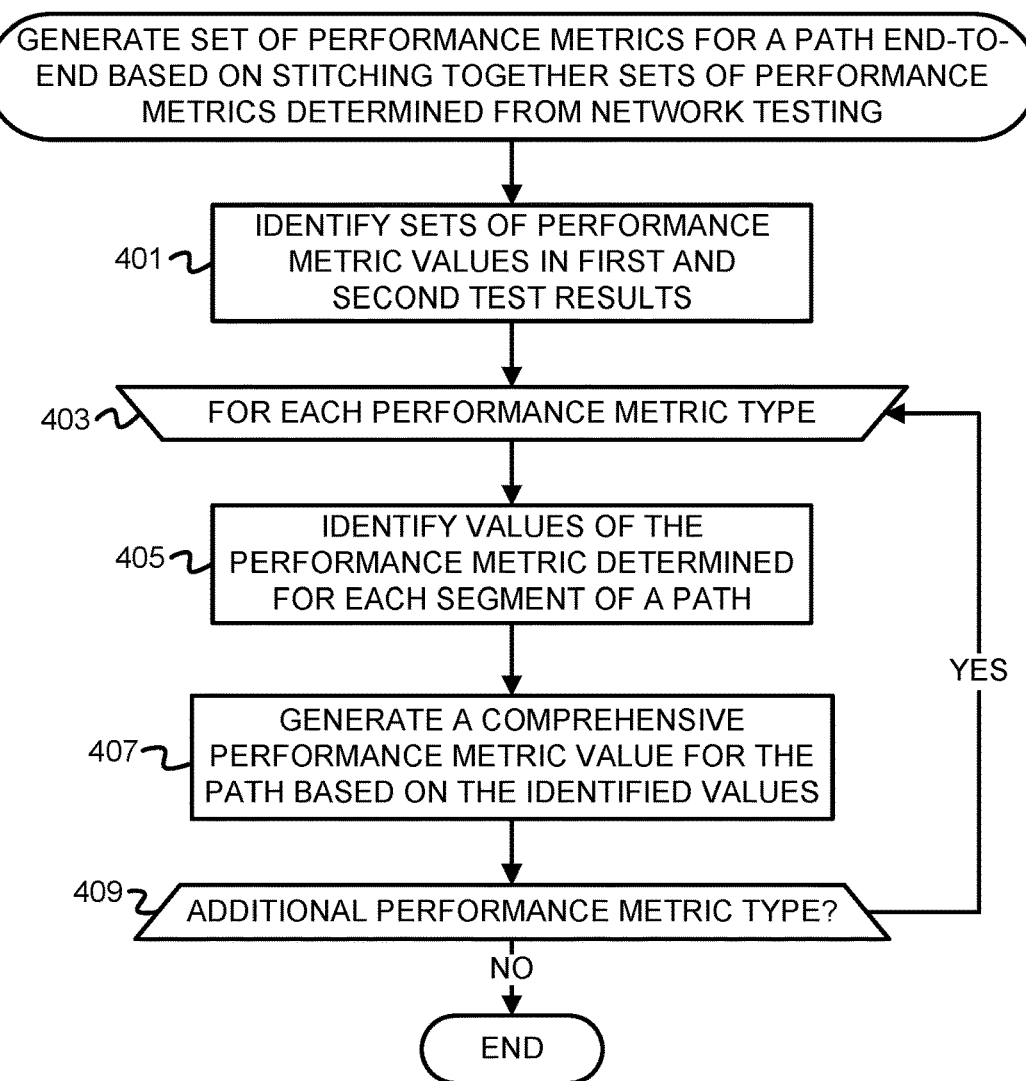

GENERATE SET OF PERFORMANCE METRICS FOR A PATH END-TO-END BASED ON STITCHING TOGETHER SETS OF PERFORMANCE METRICS DETERMINED FROM NETWORK TESTING

401 — IDENTIFY SETS OF PERFORMANCE METRIC VALUES IN FIRST AND SECOND TEST RESULTS

403 — FOR EACH PERFORMANCE METRIC TYPE

405 — IDENTIFY VALUES OF THE PERFORMANCE METRIC DETERMINED FOR EACH SEGMENT OF A PATH

407 — GENERATE A COMPREHENSIVE PERFORMANCE METRIC VALUE FOR THE PATH BASED ON THE IDENTIFIED VALUES

409? — ADDITIONAL PERFORMANCE METRIC TYPE?

YES

NO

END

FIG. 4

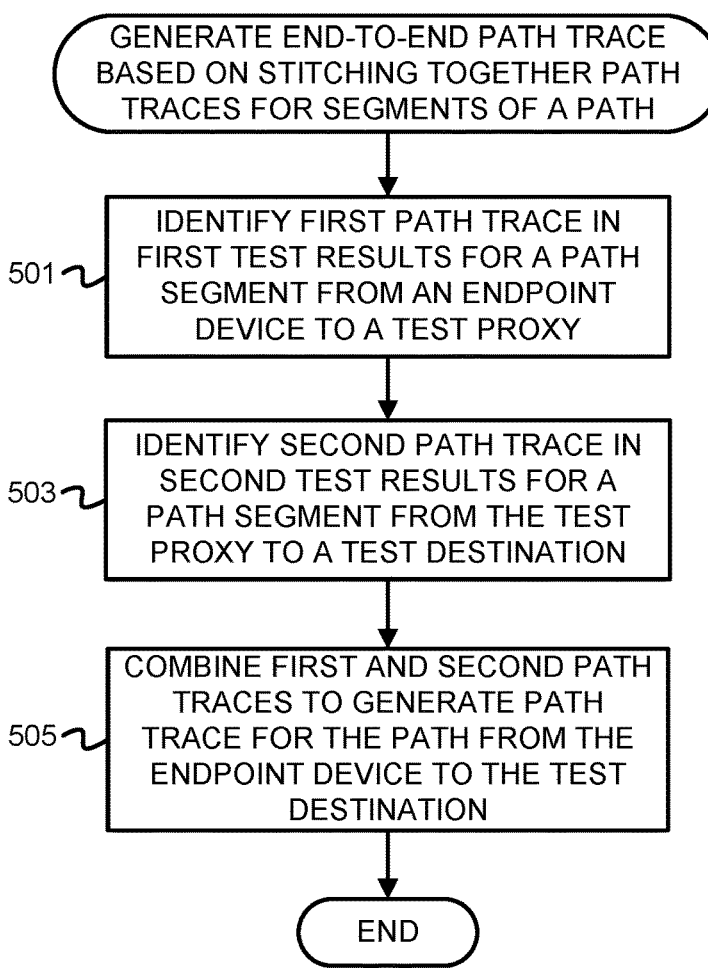

GENERATE END-TO-END PATH TRACE BASED ON STITCHING TOGETHER PATH TRACES FOR SEGMENTS OF A PATH

501 — IDENTIFY FIRST PATH TRACE IN FIRST TEST RESULTS FOR A PATH SEGMENT FROM AN ENDPOINT DEVICE TO A TEST PROXY

503 — IDENTIFY SECOND PATH TRACE IN SECOND TEST RESULTS FOR A PATH SEGMENT FROM THE TEST PROXY TO A TEST DESTINATION

505 — COMBINE FIRST AND SECOND PATH TRACES TO GENERATE PATH TRACE FOR THE PATH FROM THE ENDPOINT DEVICE TO THE TEST DESTINATION

END

FIG. 5

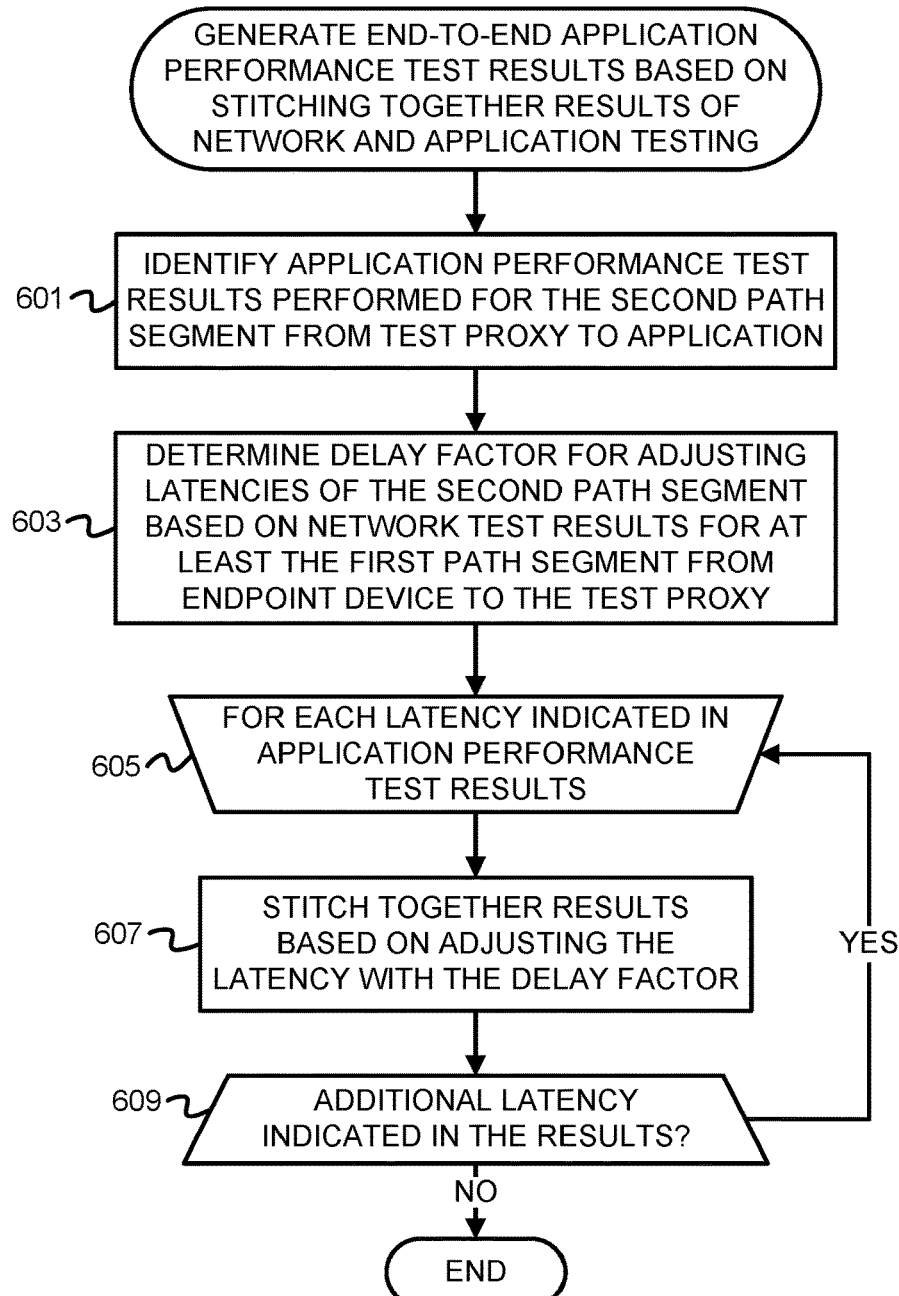

GENERATE END-TO-END APPLICATION PERFORMANCE TEST RESULTS BASED ON STITCHING TOGETHER RESULTS OF NETWORK AND APPLICATION TESTING

601 — IDENTIFY APPLICATION PERFORMANCE TEST RESULTS PERFORMED FOR THE SECOND PATH SEGMENT FROM TEST PROXY TO APPLICATION

603 — DETERMINE DELAY FACTOR FOR ADJUSTING LATENCIES OF THE SECOND PATH SEGMENT BASED ON NETWORK TEST RESULTS FOR AT LEAST THE FIRST PATH SEGMENT FROM ENDPOINT DEVICE TO THE TEST PROXY

605 — FOR EACH LATENCY INDICATED IN APPLICATION PERFORMANCE TEST RESULTS

607 — STITCH TOGETHER RESULTS BASED ON ADJUSTING THE LATENCY WITH THE DELAY FACTOR

609 — ADDITIONAL LATENCY INDICATED IN THE RESULTS?

YES

NO

END

FIG. 6

PROXIED TESTING AND STITCHING OF RESULTS FOR REDUCED TRAFFIC SYNTHETIC TESTING

BACKGROUND

The disclosure generally relates to transmission of digital information (e.g., CPC subclass H04L) and to wireless communication networks (e.g., CPC subclass H04 W).

Network or application performance testing may be achieved through monitoring of actual network traffic (e.g., with packet capture) and/or through synthetic monitoring. Synthetic monitoring, also referred to as synthetic testing, refers to generation of network traffic that targets a specific network-accessible destination to be tested, such as a network element or an application or service, and analysis of performance metrics and/or responses captured or observed as a result. Such synthetic network traffic can be of various types (e.g., in terms of associated communication protocol) depending on the target of testing to simulate user and/or network activity. As an example, synthetic monitoring can be employed to test performance of network elements along a path to a network-accessible resource through generation of network layer/layer 3 network traffic directed to a specific Internet Protocol (IP) address or hostname, such as in the case of using traceroute. Synthetic monitoring may also be employed to test accessibility of applications or services to users by simulating retrieval of webpages or application programming interface (API) invocations by users through generation of application layer/layer 7 application network traffic (e.g., Hypertext Transfer Protocol (HTTP)/HTTP Secure (HTTPS) traffic).

Secure access service edge (SASE) is a framework that has emerged in response to changing network security needs of organizations as a growing number of employees are located remotely and cloud-hosted applications and data storage are increasingly favored over on-premises solutions. SASE combines wide area networking, including software-defined wide area networks (SD-WANs), with cloud-delivered network security services, such as secure web gateways (SWGs) and cloud-based firewalls delivered according to the firewall as a service (FWaaS) model.

BRIEF DESCRIPTION OF THE DRAWINGS

Embodiments of the disclosure may be better understood by referencing the accompanying drawings.

FIG. 4 is a flowchart of example operations for generating a set of performance metrics for a path end-to-end based on stitching together sets of performance metrics determined from network testing.

FIG. 5 is a flowchart of example operations for generating an end-to-end path trace based on stitching together path traces for segments of a path.

FIG. 6 is a flowchart of example operations for generating end-to-end application performance test results based on stitching together results of network and application testing.

DESCRIPTION

Figure 1:
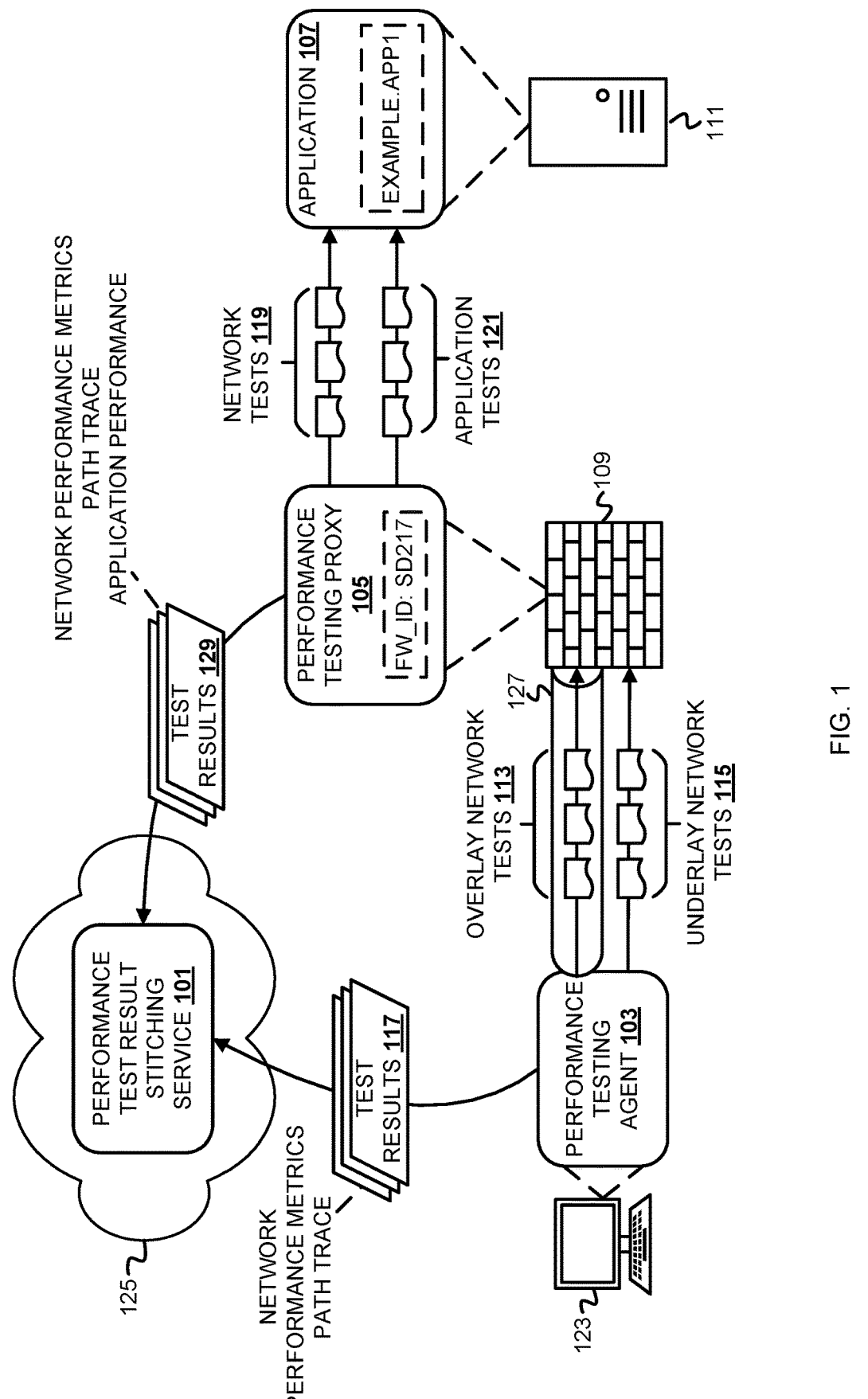
FIG. 1 is a conceptual diagram of proxying network and application performance tests for synthetic testing with reduced network traffic volume.

The description that follows includes example systems, methods, techniques, and program flows to aid in understanding the disclosure and not to limit claim scope. Well-known instruction instances, protocols, structures, and techniques have not been shown in detail for conciseness.

Terminology

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider. In more general terms, a cloud service provider resource accessible to customers is a resource owned/managed by the cloud service provider entity that is accessible via network connections. Often, the access is in accordance with an API or software development kit provided by the cloud service provider.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

When utilizing synthetic testing to run performance tests between an application that is the target of testing and multiple endpoints within an organization that are behind a common gateway (e.g., an Internet gateway/SWG) and/or security component, there is a risk that the amount of network traffic being generated could trigger distributed denial of service (DDOS) attack detection based on rate limits established for the application. Detecting tests as DDOS attacks could result in blacklisting the offending IP addresses. High volumes of network traffic from multiple endpoints to an internal service of the organization could also trigger security policy enforcement, causing tests to fail and leading to inaccurate results.

Disclosed herein is a technique for proxying application and network performance tests executed for paths between endpoints connected to a network and the target of testing that mitigates these risks, where a network element or a security component (e.g., a firewall or SWG) of the network acts as a test proxy. Application and network testing for each endpoint behind the test proxy for a path between the endpoint to the target of testing is split into two segments: a first segment from each endpoint to the test proxy, and a second segment from the test proxy to the target of testing. The test proxy thus proxies testing along the second segment of the path for each of the endpoints, reducing the volume of network traffic sent to the target of testing. A service obtains results of testing from agents executing on the endpoints and the network/security component and "stitches" the results of each segment together to generate end-to-end test results for the path from each endpoint to the destination. Stitching test results refers to aggregating (e.g., adding), combining, or otherwise joining the test results obtained for each segment of the path. The manner of stitching results can vary depending on test type, such as based on type of network traffic generated (i.e., application layer traffic or network layer traffic) and/or types of performance metrics collected. Stitching test results for each endpoint yields a single, comprehensive set of results that represents the path from endpoint to application and may be presented as a result of seamlessly testing the path end-to-end but without the drawbacks that may be realized from such end-to-end testing.

Example Illustrations

FIG. 1 is a conceptual diagram of proxying network and application performance tests for synthetic testing with reduced network traffic volume. An endpoint device 123 is connected to a network (not depicted) secured with a firewall 109. The firewall 109 may be a cloud-based firewall (e.g., FWaaS). FIG. 1 assumes that a tunnel 127 has been established between the endpoint device 123 and the firewall 109. For instance, the tunnel 127 may be a virtual private network (VPN) tunnel for a VPN to which the endpoint device 123 is connected. A single endpoint device is depicted for clarity and to aid in understanding, though in implementations a plurality of endpoint devices can establish a network connection (e.g., a VPN connection) for a network secured by the firewall 109. An application 107 with an exemplary uniform resource locator (URL) "example.app1" is hosted on at least a server 111. This example assumes that the application 107 is a Software-as-a-Service (SaaS) application and is accessible to the endpoint device 123 via the Internet. As used below, "the path" refers to a route from the endpoint device 123 to the server 111 hosting the application 107.

A performance test result stitching service ("service") 101 executes in a cloud 125. A performance testing agent ("agent") 103 executing on the endpoint device 123 and a performance testing proxy ("testing proxy") 105 executing as part of the firewall 105 can communicate with the service 101 (e.g., via secure connections negotiated therebetween). The testing proxy 105 executes as an agent alongside the firewall 109. For instance, the testing proxy 105 may be instantiated in a container or virtual machine that executes on or by (e.g., via a container runtime) the firewall 109. The agent 103 and testing proxy 105 periodically (e.g., at preconfigured intervals, according to a schedule, etc.) test performance of the application 107 and/or network(s) by which the endpoint device 123 accesses the application 107. Testing by the agent 103 and the testing proxy 105 can occur concurrently, and testing by the agent 103 and testing proxy is not necessarily synchronized.

The agent 103 executes overlay network tests 113 and underlay network tests 115 for the segment of the path from the endpoint device 123 to the firewall 109. A network test can include a path trace and/or a test to measure one or more network performance metrics (e.g., latency, jitter, and/or loss). The overlay network tests 113 comprise network tests to collect performance metrics for the overlay network represented by the tunnel 127 (e.g., the corresponding VPN). Overlay network testing targets an internal IP address of the firewall 109, which may be an IP address associated with an endpoint of the tunnel 127. The underlay network tests 115 comprise network tests to measure performance metrics and perform a path trace for the underlay network over which the tunnel 127 is established. Underlay network tests target a public IP address associated with the firewall 109 that the agent 103 determines.

For the collection of performance metrics performed as part of the overlay network tests 113 and underlay network tests 115, the agent 103 can send a set of one or more packets destined for the corresponding IP address (i.e., the internal IP address of the firewall 109 for the overlay network tests 113 and the public IP address for the underlay network tests 115) and, for each packet, record a latency associated with the time between sending the packet and receipt of a response from the packet destination. Each packet targeting the corresponding IP address can be a Transmission Control Protocol (TCP) synchronize (SYN) packet or an Internet Control Message Protocol (ICMP) echo request. For each packet, the agent 103 designates a time to live (TTL) value to be included therein, which may be a default value maintained by the agent 103 that is sufficiently large to ensure delivery (e.g., 255). Since the recorded latency between sending the packet and receiving a response will be a round trip time, the agent 103 may determine an end-to-end latency from each recorded latency for the segment of the path from the endpoint device 123 to the firewall 109 (e.g., based on halving the round trip time). The agent 103 can further determine a packet loss for the segment of the path based on a count of packets sent for which a corresponding response was not received (e.g., a TCP SYN acknowledgement (SYN-ACK) or ICMP echo reply).

For the path trace performed as part of the underlay network tests 115, the agent 103 executes a trace route command (e.g., traceroute or tracert) that specifies the public IP address corresponding to the firewall 109 and records the results of each path trace. The agent 103 may perform a designated number of path traces to account for timeouts of one or more hops along the route and assemble the resulting path traces. The path trace(s) that results and is recorded by the agent 103 comprises IP addresses of each hop along the segment of the path from the endpoint device 123 to the firewall 109 and corresponding latencies of each hop.

The agent 103 generates test results 117 based on the results of the overlay network tests 113 and the underlay network tests 115. The test results 117 comprise the path trace and the sets of performance metrics including latency, jitter, and/or packet loss. The agent 103 can include collected performance metrics in the test results 117 or can preprocess the performance metrics prior to inclusion in the test results 117. For instance, if the agent 103 determined multiple latencies for either the overlay network tests 113 or the underlay network tests 115, the agent 103 can aggregate (e.g., average) the latencies determined for each of the tests. The agent 103 can further determine jitter for the path segment by computing a standard deviation of the latencies that did not time out.

The agent 103 sends the test results 117 to the service 101. Prior to sending, the agent 103 may attach (e.g., label, tag, or otherwise associate) an identifier of the endpoint device 123 to the test results 117, such as a device identifier, a device IP address, etc. Sending of test results to the service 101 may occur after each testing interval or may occur according to a different schedule such that the agent 103 sends results to the service 101 in batches (e.g., a batch of generated results hourly). For instance, in the case of the latter, the agent 103 may continue periodic testing and collection of test results until expiration of the time interval for communication of results to the service 101, until the next scheduled communication of results, etc.

The testing proxy 105 performs network tests 119 and application tests 121 for the segment of the path from the firewall 109 to the server 111. The network tests 119 for the path segment tested by the testing proxy 105 are to test the path that would be traversed by network traffic sent to the application 107 by the endpoint device 123 and thus target the application 107 (e.g., via an IP address and/or a uniform resource locator (URL) of the application 107). The network tests 119 comprise tests to collect performance metrics for the path segment and/or to perform a path trace of the path segment. Performance metric collection and path tracing for the path segment through generation of TCP/ICMP traffic can occur as similarly described above in reference to performance metric collection by the agent 103. The application tests 121 comprise tests that aid in determining performance of the application 107 and distinguishing application 107 performance issues from network performance issues. The application tests 121 can comprise one or more HTTP/HTTPS requests (e.g., a GET request(s)) to request a resource(s) of the application 107, one or more Domain Name System (DNS) requests, to invoke an API of the application 107, etc. For each of the application tests 121, the testing proxy 105 can record whether a response to the issued request was received and/or a latency associated with receiving a response to the request (if any). The testing proxy 105 may further record a type of the response, such as an indication of whether the request was successful or if the request failed (e.g., based on an HTTP status code included in the response).

The testing proxy 105 generates test results 129 based on the results of the network tests 119 and the application tests 121. The test results 129 in this example include performance metrics collected for the segment of the path between the firewall 109 and the application 107, a path trace of the path segment, and application performance results indicating a latency(ies) and/or indication of request success for requesting resources of or otherwise invoking functionality of the application 107. As also similarly described above, the testing proxy 105 can include performance metrics collected from the network tests 119 and/or application tests 121 in the test results 129 or can preprocess the performance metrics prior to inclusion in the test results 129, such as to determine an end-to-end latency(ies) from a measured round trip time(s), an aggregate latency, and/or jitter.

The testing proxy 105 sends the test results 129 to the service 101. Prior to sending, the agent 103 may attach an identifier of the firewall 109 to the test results 129, such as a firewall identifier given as "SD217" in this example. Sending of test results to the service 101 may occur after each testing interval or may occur according to a different schedule such that the testing proxy 105 sends results to the service 101 in batches (e.g., a batch of generated results hourly).

Upon obtaining the test results 117 and test results 129, the service 101 correlates the test results 117 corresponding to the endpoint device 123 with the test results 129 corresponding to the firewall 109 that services the endpoint device 123. The service 101 can do so by mapping the device identifier indicated in the test results 117 with the firewall identifier indicated in the test results 129 based on maintained associations between endpoint devices, public IP addresses of the endpoint devices, and the corresponding firewalls. The maintained associations can be built and maintained based on firewall 109 logs and/or VPN logs for a VPN to which endpoint devices including the endpoint device 123 are connected. The service 101 can then stitch together the test results 117 for the first segment of the path and the test results 129 for the second segment of the path. Stitching of test results is described in reference to FIG. 2.

FIG. 1 depicts the testing proxy 105 as executing as part of the firewall 109. Instances of the testing proxy 105 can execute as part of an SD-WAN router, SWG, etc. that comprises a tunnel endpoint for tunneling of network traffic sent to and from endpoint devices connected thereto. In implementations where instances of the testing proxy 105 execute as part of SD-WAN routers, the service 101 may execute as part of an SD-WAN controller that can communicate with the SD-WAN routers.

Figure 2:
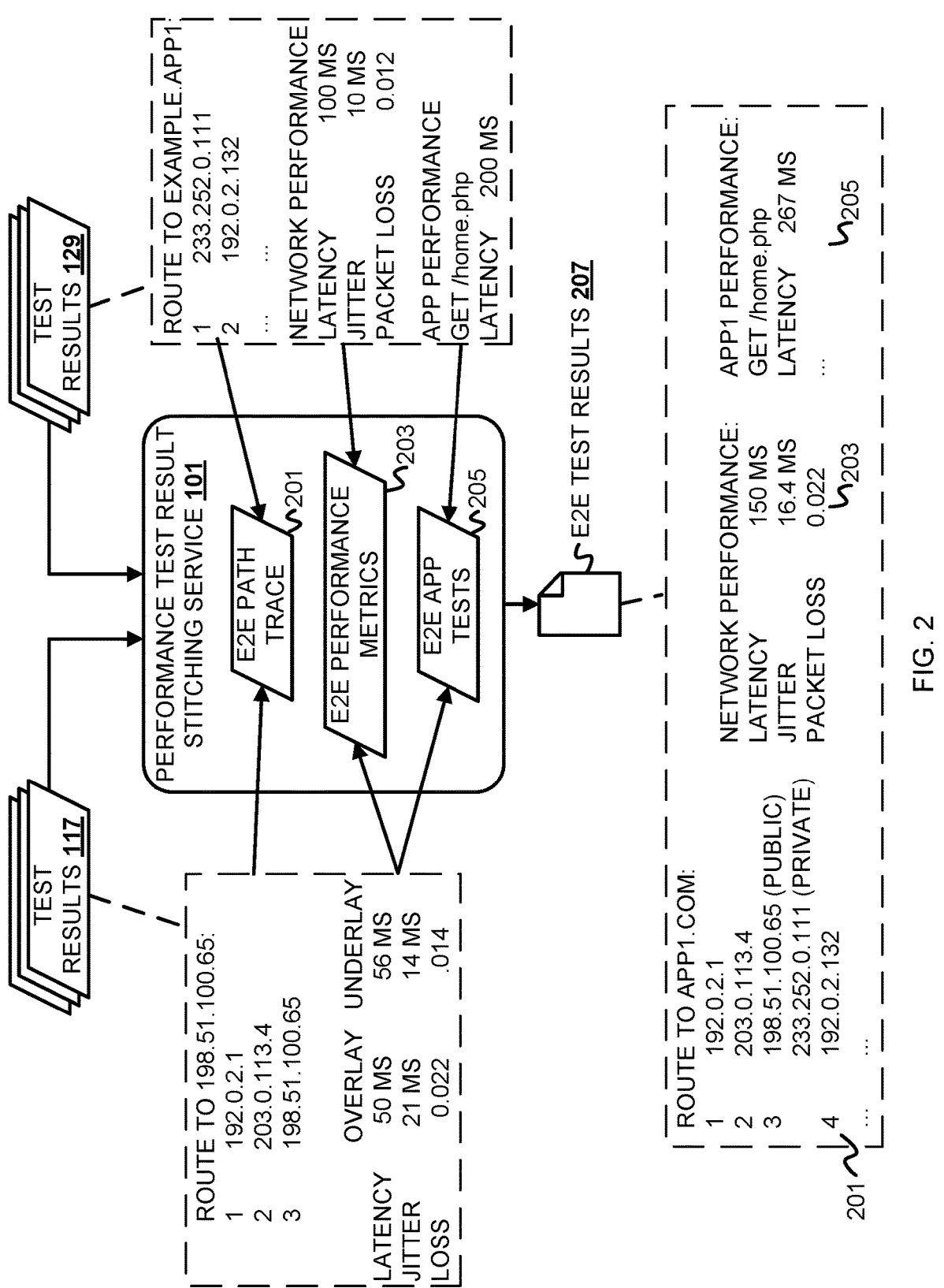
FIG. 2 is a conceptual diagram of stitching results of proxied performance testing for segments of a path to generate end-to-end test results for the path.

FIG. 2 is a conceptual diagram of stitching results of proxied performance testing for segments of a path to generate end-to-end test results for the path. FIG. 2 depicts stitching of exemplary test results obtained for first and second segments of a path, or the test results 117 and test results 129, respectively. The test results 117 are depicted as comprising a path trace to an IP address 198.51.100.65, which is given as an exemplary public IP address associated with the firewall 109 of FIG. 1, and performance metrics for the paths to the firewall 109 via the overlay network (i.e., via the tunnel 127 of FIG. 1) and via the underlay network. The test results 129 are depicted as comprising a path trace for the route to the application 107 given by its exemplary URL, "example.app1", performance metrics for the route to the application 107, and performance metrics for an exemplary request issued to the application 107 to access a web page thereof.

The service 101 stitches the test results 117 and the test results 129 together to yield three sets of end-to-end test results in this example: an end-to-end path trace, a set of end-to-end performance metrics, and a set of end-to-end application performance test results, depicted in FIG. 2 as an end-to-end path trace 201, end-to-end performance metrics 203, and end-to-end application test results 205, respectively. Stitching the test results 117 and the test results 129 together to generate respective ones of the end-to-end test results can be achieved through a variety of manners that can vary across performance test types (e.g., application testing or network testing, performance metric collection or path tracing, etc.). For instance, performance test results can be stitched by combining or joining subsets of the test results into one collective set. As another example, performance test results can be stitched by aggregating, combining, or otherwise joining values of performance metrics corresponding to each segment of the path to generate a single performance metric value representing the path end-to-end. Exemplary stitching techniques to generate the end-to-end path trace 201, the end-to-end performance metrics 203, and the end-to-end application test results 205 are described in greater detail herein as an illustrative example, though stitching can vary in implementations in terms of the manner in which results are stitched together and/or the specific subsets of results that are stitched together.

To generate the end-to-end path trace 201, the service 101 stitches together the path trace of the test results 117 comprising the IP addresses of nodes along the first segment of the path and the path trace of the test results 129 comprising the IP addresses of nodes along the second segment of the path (including any latencies measured for each hop). The service 101 can combine each path trace to generate a single trace of the path end-to-end, or the path from the endpoint device 123 to the application 107. The underlay network testing based on which the first segment's path trace indicated in the test results 117 were generated may have targeted a public IP address associated with the network element/security component on which the testing proxy 105 executes (i.e., the firewall 109 in FIG. 1), while the firewall 109 is also associated with a private/internal IP address that is reported as a first hop of the path trace for the second path segment indicated in the test results 129. The hop of the path trace to which the firewall 109 corresponds may thus be associated with a public/external IP address and a private/internal IP address in each respective segment path trace. The service 101 can thus determine both IP addresses obtained for this hop, or the IP addresses of the last hop of the first segment path trace and the first hop of the second segment path trace, and designate both IP addresses as corresponding to the same hop in the end-to-end path trace 201. To illustrate, with reference to FIG. 1, the third hop indicated in the end-to-end path trace 201 is identified with the IP address 198.51.100.65 (assumed to be a public IP address associated with the firewall 109) and the IP address 233.252.0.111 (assumed to be a private IP address associated with the firewall 109), with each IP address denoted as public or private accordingly.

To generate the end-to-end performance metrics 203, the service 101 stitches together performance metric values of the test results 117 and the test results 129 corresponding to each segment of the path to generate performance metrics representing the path end-to-end. The service 101 can utilize different techniques to stitch different performance metric types to combine the respective values. For latencies of each segment of the path, the service 101 can combine the latencies through aggregation (e.g., adding) to generate a latency for the path. For instance, with reference to FIG. 2, assuming an overlay traffic latency of 50 milliseconds (ms) for the first segment and an application traffic latency of 100 ms for the second segment, the service 101 aggregates the latencies to yield an end-to-end latency of 150 ms. For jitter of each segment of the path, the service 101 can combine the jitter values through pooling or otherwise computing of a representative jitter value for the path. The jitter value that represents the path can be based on the jitter value for the first segment calculated based on overlay network testing and the jitter value for the second segment determined for network traffic sent from the test proxy to the application. As an example, the service 101 can compute a pooled standard deviation based on the jitter values of each segment, where the pooled standard deviation is the representative jitter value for the path. With reference to FIG. 2, assuming a first segment jitter of 21 ms for the overlay network testing results and a second segment jitter of 10 ms, the service 101 can compute a pooled standard deviation and thus the representative jitter for the path as approximately 16.4 ms (i.e., the root mean square of the two jitter values 21 ms and 10 ms). For packet loss of each segment of the path, the service 101 can determine a representative packet loss value for the path based on the packet loss values of each path segment, such as by combining the packet loss values to determine a new packet loss value or selecting one of the packet loss values as representative packet loss for the path. As with jitter, the packet loss value for the first segment that is evaluated may be the packet loss value determined from overlay network testing. In this example, the service 101 selects the greater of the packet loss values determined for the path segments as the representative packet loss of the path. With reference to FIG. 2, assuming a packet loss of the first segment of 0.022 resulting from overlay network testing and a packet loss of the second segment of 0.012, the service 101 determines that the first segment packet loss is greater and selects the corresponding value (i.e., 0.022) as representative of packet loss for the path.

To generate the end-to-end application test results 205, the service 101 can stitch together performance metric values of the test results 129 for application traffic and one or more performance metric values of the test results 117 to account for delay of the first segment of the path that would be incurred in real (i.e., non-synthetic) traffic conditions. For example, the service 101 can stitch together a latency measured for application traffic along the second segment of the path (e.g., HTTP/HTTPS traffic) and at least a first latency measured for overlay traffic of the first segment. The latency measured for overlay testing of the first segment can be utilized rather than the latency measured for underlay testing because network traffic destined for the application 107 will be sent over the tunnel 127 of FIG. 1, so the overlay latency thus can be used to simulate the associated delay that would be incurred on the first segment of the path.

As an example, the service 101 can determine a delay factor based on the overlay latency for the first segment and the latency for the second segment. An exemplary computation for determining a delay factor value is 1+ (overlay latency/(overlay latency+application traffic latency)). The service 101 then stitches the application traffic latency and the overlay latency together by adjusting the latency for application traffic of the second segment with the delay factor computed based on the overlay and application traffic latencies to generate an adjusted latency that it includes in the end-to-end application test results 205. To illustrate, with reference to FIG. 2, for an overlay latency of 50 ms and an application traffic latency of 200 ms, using the exemplary delay factor calculation, the adjusted application traffic latency is approximately 267 ms.

The service 101 generates end-to-end test results 207 comprising the results of each test type, or the end-to-end path trace 201, the end-to-end performance metrics 203, and the end-to-end application test results 205. The service 101 can indicate the end-to-end test results 207 as results of tests performed for the path from the endpoint device 123 to the application 107 without interruption. Indicating the end-to-end test results 207 can include generating a notification or report comprising the results 207 and displaying the report or notification (e.g., via a graphical user interface (GUI)), storing the report or notification (e.g., in a repository), etc.

FIGS. 3-6 are flowcharts of example operations of proxied testing and stitching of results for reduced-traffic synthetic testing of application and/or network performance. The example operations are described with reference to a test result stitching service (hereinafter simply "the service") for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 3:
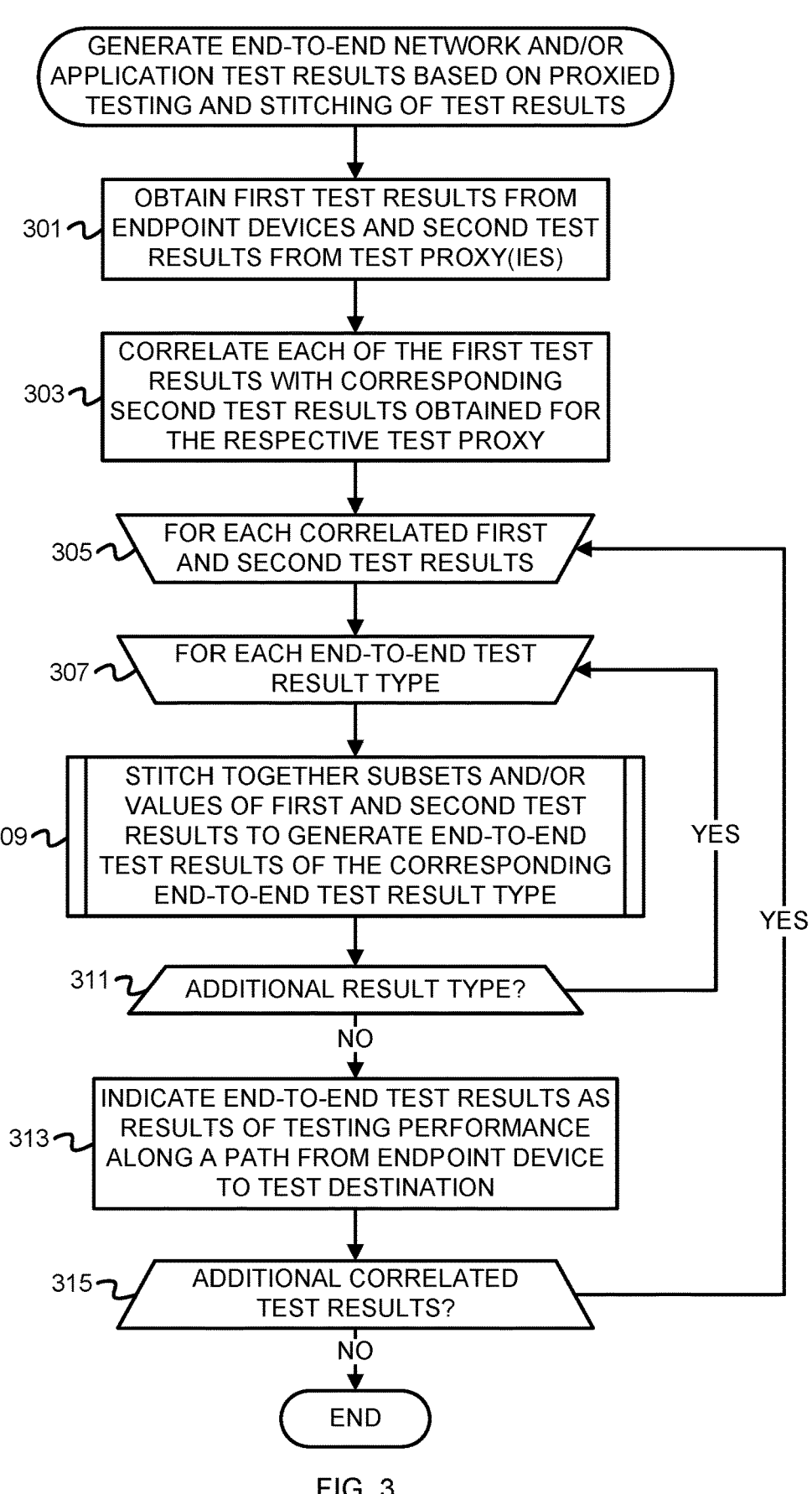
FIG. 3 is a flowchart of example operations for generating end-to-end network and/or application test results based on proxied testing and stitching of test results.

FIG. 3 is a flowchart of example operations for generating end-to-end network and/or application test results based on proxied testing and stitching of test results. The example operations assume that an agent has been installed on each endpoint device of a network for which tests are to be executed. The agent(s) performs network testing for a path from the endpoint device to a test proxy, which can execute on a network element and/or a security component to which the endpoint device connects. A network element/security component may be a firewall, including cloud firewalls, a SWG, an SD-WAN router, etc. deployed or instantiated in the network. The endpoint device is also assumed to have established a secure, tunneled connection (e.g., a VPN connection) with the network element or security component comprising the test proxy. Multiple test proxies may be deployed in the network, and the service can obtain results from each of the test proxies. The example operations also assume that each test proxy performs network and/or application testing for a path from the test proxy to a target application (e.g., a SaaS application). Multiple applications may be targets of testing; in other words, each test proxy can perform testing targeting one or more applications.

At block 301, the service obtains first test results from the endpoint device(s) and second test results from the test proxy(ies). The service can receive the test results based on the endpoint device agent(s) and the test proxy(ies) communicating the respective test results to the service or can poll the agent(s) executing on the endpoint device(s) and the test proxy(ies) for test results. Each of the first test results should identify the corresponding endpoint device for which the test results were generated, such as with a device identifier and/or IP address attached to the results. Each of the second test results should identify the corresponding network element/security component, such as with a firewall identifier and/or network address attached to the results. The first and second test results may also indicate timestamps associated with result generation. Receipt of the first and second test results does not necessarily occur at substantially the same time.

At block 303, the service correlates each of the first test results with a corresponding one of the second test results obtained for the respective test proxy. Since a plurality of endpoint devices may connect to a test proxy and a plurality of test proxies may be deployed or instantiated in the network, the service correlates the first and second test results to obtain test results generated from testing the path in two segments (i.e., from the endpoint device to the test proxy and from the test proxy to the target application). Correlation of test results can be based on correlating the identity of each endpoint device indicated in the first test results with a corresponding security component or network element serving as a test proxy to which the endpoint device is connected. The service may, for instance, maintain associations between indications of endpoint devices (i.e., device identifiers/IP addresses) and indications of network elements/security components to which each endpoint device connects (e.g., based on identifiers and associated IP addresses), such as in a data structure. The service can perform a lookup of each endpoint device identity determined from the first test results in the maintained associations to determine the corresponding network element/security component and, in turn, identify the corresponding one of the second results. Additionally, testing by the agent(s) and the test proxy(ies) is not necessarily synchronized. In such cases, correlation of each of the first test results is with the most relevant one of the second results (i.e., the most temporally proximate). For instance, the service can evaluate timestamps of the second test results to determine which is closest to a timestamp of each of the first test results.

At block 305, the service begins iterating over each correlated first and second test results. The correlated results comprise results generated from a first segment of the path from the endpoint device to the target application, or the path from the endpoint device to the test proxy, and results generated for a second segment of the path from the endpoint device to the target application, or the path from the test proxy to the target application.

At block 307, the service begins iterating through each end-to-end result type. An end-to-end result type refers to a type of results to be generated for the path end-to-end (i.e., from the endpoint device to the target application). Result types can include network testing results and/or application testing results. Network testing results can further include results of path tracing and collection of performance metrics.

At block 309, the service stitches together subsets and/or values of the first and second test results to generate end-to-end test results of the corresponding type. The service stitches together subsets of each of the first and second test results (e.g., based on combining or joining subsets) and/or values of each of the first and second results (e.g., based on aggregating or otherwise merging/joining) to yield stitched results representative of the path end-to-end. Example operations for stitching of test results to obtain end-to-end result of a corresponding type are given in reference to FIGS. 4-6. One or more of the stitching techniques described below can be implemented, with each stitching technique implemented to generate a corresponding end-to-end test result type.

At block 311, the service determines if there is an additional result type to be generated. If so, operations continue at block 307. Otherwise, operations continue at block 313.

At block 313, the service indicates the end-to-end test results as results of testing performance along the path from the endpoint device to the test destination. Indication of the end-to-end results can be via storing the results (e.g., in a database or other data store), generating a notification or report from the results, and/or presenting the results on a GUI, for example. The service can indicate the results as results of continuous testing of the path, or without proxying results for the second segment of the path from the test proxy to the target application. For instance, the end-to-end test results that are indicated can comprise performance metrics stitched together for the path end-to-end without also indicating the performance metrics collected for each segment of the path.

At block 315, the service determines if additional correlated results remain for stitching. If so, operations continue at block 305. Otherwise, operations are complete.

While FIG. 3 depicts operations as being complete after block 315, collection of test results and the correlation and stitching thereof can be periodic and ongoing. For instance, when a next period of results collection and stitching is triggered (e.g., based on a schedule or passage of a designated time interval), operations can again commence at block 301.

FIGS. 4-6 are flowcharts of example operations for stitching together test results obtained for segments of a path. The example operations of FIG. 4, FIG. 5, and/or FIG. 6 can implement block 309 of FIG. 3. The example operations refer to the first test results and the second test results of FIG. 3.

FIG. 4 is a flowchart of example operations for generating a set of performance metrics for a path end-to-end based on stitching together sets of performance metrics determined from network testing. The example operations assume that the first and second test results comprise sets of values of one or more performance metrics. The performance metric values may have been determined based on testing an underlay network, such as via generation of network traffic destined for a public IP address associated with the network element/security component acting as the test proxy, or based on testing an overlay network, such as via generation of network traffic destined for an internal IP address associated with the network element/security component acting as the test proxy (e.g., network traffic generated and sent via a VPN tunnel).

At block 401, the service identifies sets of performance metric values indicated in the first and second test results. The first and second test results can comprise values of performance metrics of one or more types, such as latency, jitter, and/or packet loss. Each set of performance metric values corresponds to a respective segment of a path from an endpoint device to a test destination. In particular, the first test results comprise a set of performance metric values determined for a first segment of the path formed by a path from the endpoint device to a test proxy, and the second test results comprise a set of performance metric values determined for a second segment of the path formed by a path from the test proxy to the test destination.

At block 403, the service begins iterating over each performance metric type for which values in each set are to be stitched together. Performance metric types for which values should be stitched can include latency, jitter, and/or packet loss. The service may determine the performance metric types indicated in the first and second results to determine the types for which values should be stitched or may maintain indications of the performance metric types for which values are to be stitched (e.g., in a list or other data structure).

At block 405, the service identifies values of the performance metric determined for each segment of the path. For instance, the service can identify first and second latencies, first and second jitter values, or first and second packet loss values.

At block 407, the service generates a comprehensive performance metric value for the path based on the identified values of the performance metric. The manner of generating the comprehensive performance metric value for the path based on the performance metric values determined for each path segment can vary by performance metric type. For latencies, the service can aggregate (e.g., add) the first latency and the second latency to generate an aggregate latency for the path, where the comprehensive performance metric value is the aggregate latency. For jitter, the service can determine a representative jitter for the path based on the jitter of each path segment. For instance, the service can compute a pooled standard deviation based on the jitter values, where the resulting pooled standard deviation is the comprehensive performance metric value. For packet loss, the service can determine a representative packet loss for the path based on the packet loss determined for each path segment, such as based on computation of the representative packet loss value or selecting one of the packet loss values as the representative value. For instance, the service may determine the greater of the packet loss values and select the greater value as the packet loss representative of the path.

At block 409, the service determines if an additional performance metric type remains. If so, operations continue at block 403. Otherwise, the sets of performance metric values have been stitched together, and operations are complete.

FIG. 5 is a flowchart of example operations for generating an end-to-end path trace based on stitching together path traces for segments of a path. The example operations assume that the first and second results comprise respective path traces.

At block 501, the service identifies a first path trace in the first results for a path segment from an endpoint device to the test proxy. The path segment in the first results is a segment of a path from an endpoint device to a test destination (the "end-to-end path") that starts at the endpoint device and ends at the test proxy. The first path trace indicates IP addresses of each hop along the path segment and may also indicate a latency associated with each hop.

At block 503, the service identifies a second path trace in the second results for a path segment from the test proxy to the test destination. The path segment in the second results is a segment of the end-to-end path that starts at the test proxy and ends at the test destination. The second path trace indicates IP addresses of each hop along the path segment and may also indicate a latency associated with each hop.

At block 505, the service combines the first and second path traces to generate a path trace for the end-to-end path from the endpoint device to the test destination. Combining the path traces refers to combining the sets of IP addresses and any latencies identified in the first and second results into a single set. The resulting combined path trace comprises IP addresses of the hops in the path from the endpoint device to the test destination. As part of combining the first and second path traces, the service can combine the IP address of the last hop of the first path trace and the IP address of the first hop of the second path trace into the same hop number in the path trace since these IP addresses can correspond to public and private IP addresses associated with the test proxy. In other words, the hop number corresponding to the test proxy in the combined path trace may be associated with two IP addresses, with one being a public IP address and the other being a private IP address.

FIG. 6 is a flowchart of example operations for generating end-to-end application performance test results based on stitching together results of network and application testing. The example operations assume that the first results comprise a latency determined for a first path segment from an endpoint device to a test proxy based on generation of network traffic sent to the test proxy via a tunnel established between the endpoint device and the test proxy. The example operations also assume that the second results comprise one or more latencies determined from testing performance of an application along a second path segment from the test proxy to the application.

At block 601, the service identifies application performance test results performed for the second path segment from the test proxy to the application. The application performance test results comprise one or more latencies determined from testing performance of the application, such as based on requesting resources of the application and/or invoking an API of the application. Application performance testing may have been performed through generation of HTTP/HTTPS traffic, DNS traffic, and/or network traffic comporting to another layer 7/application layer communication protocol and sending the generated network traffic to the application to attempt to invoke a response. The application performance test results may indicate the communication protocol(s) employed by the test proxy for application performance testing.

At block 603, the service determines, based on results of network testing for at least the first path segment, a value of a delay factor for adjusting latencies of the second path segment. The delay factor is a value with which to adjust latencies measured for layer 7/application layer traffic of the second segment to yield an estimated latency for the path end-to-end since network traffic sent from the endpoint device to the application will also traverse the first segment of the path. The service at least determines a latency of network traffic determined for the first segment based on the first test results. The determined latency of the first segment may be the latency associated with overlay network testing, or a latency determined for network traffic sent from the endpoint device to the test proxy via a tunnel. The delay factor value can then be determined based on this latency.

Determining the value of the delay factor may be based on the type of application layer/layer 7 traffic. In other words, the manner of computing the value of the delay factor can vary between application layer/layer 7 communication protocols. For instance, such as in the case of HTTP/HTTPS traffic, the value of the delay factor can be computed based on the determined latency of the first segment and based on a determined latency of layer 3/network layer traffic of the second segment (e.g., based on a latency associated with generated TCP/ICMP traffic sent from the test proxy to the application IP address). An exemplary calculation of the delay factor value determined in this manner is 1+ (first segment latency/(first segment latency/second segment network traffic latency)). As another example, in the case of DNS traffic, the latency of network traffic of the first segment can be set as the value of the delay factor. The service may also determine multiple delay factor values if multiple types of network traffic having different corresponding delay factor value calculations were generated for application performance testing.

At block 605, the service begins iterating over each latency indicated in the application performance test results. Each latency indicated in the second results may correspond to a delay associated with requesting a resource of the application, a delay associated with invoking an API of the application, etc. "The latency" refers to the latency resulting from application layer/layer 7 testing.

At block 607, the service stitches together the first and second test results based on adjusting the latency with the delay factor. The service aggregates, combines, or otherwise joins the latency and the delay factor that were determined based at least partly on the first results and the second results, respectively, to yield an adjusted latency. The adjusted latency represents an estimate of the latency associated with application layer/layer 7 traffic traversing the path end-to-end. The manner of adjusting the latency with the delay factor may be based on the application layer/layer 7 communication protocol employed for generation of network traffic for application performance testing. For instance, the service can add the latency and the value of the delay factor if the latency is associated with a first communication protocol (e.g., DNS), can multiply the latency by the value of the delay factor if the latency is associated with a second communication protocol (e.g., HTTP/HTTPS), etc.

At block 609, the service determines if an additional latency associated with application performance testing is indicated in the results. If so, operations continue at block 603. Otherwise, operations are complete.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 307-311 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine readable medium produce an article of manufacture including instructions which implement the function/act specified in the flowchart and/or block diagram block or blocks.

Figure 7:
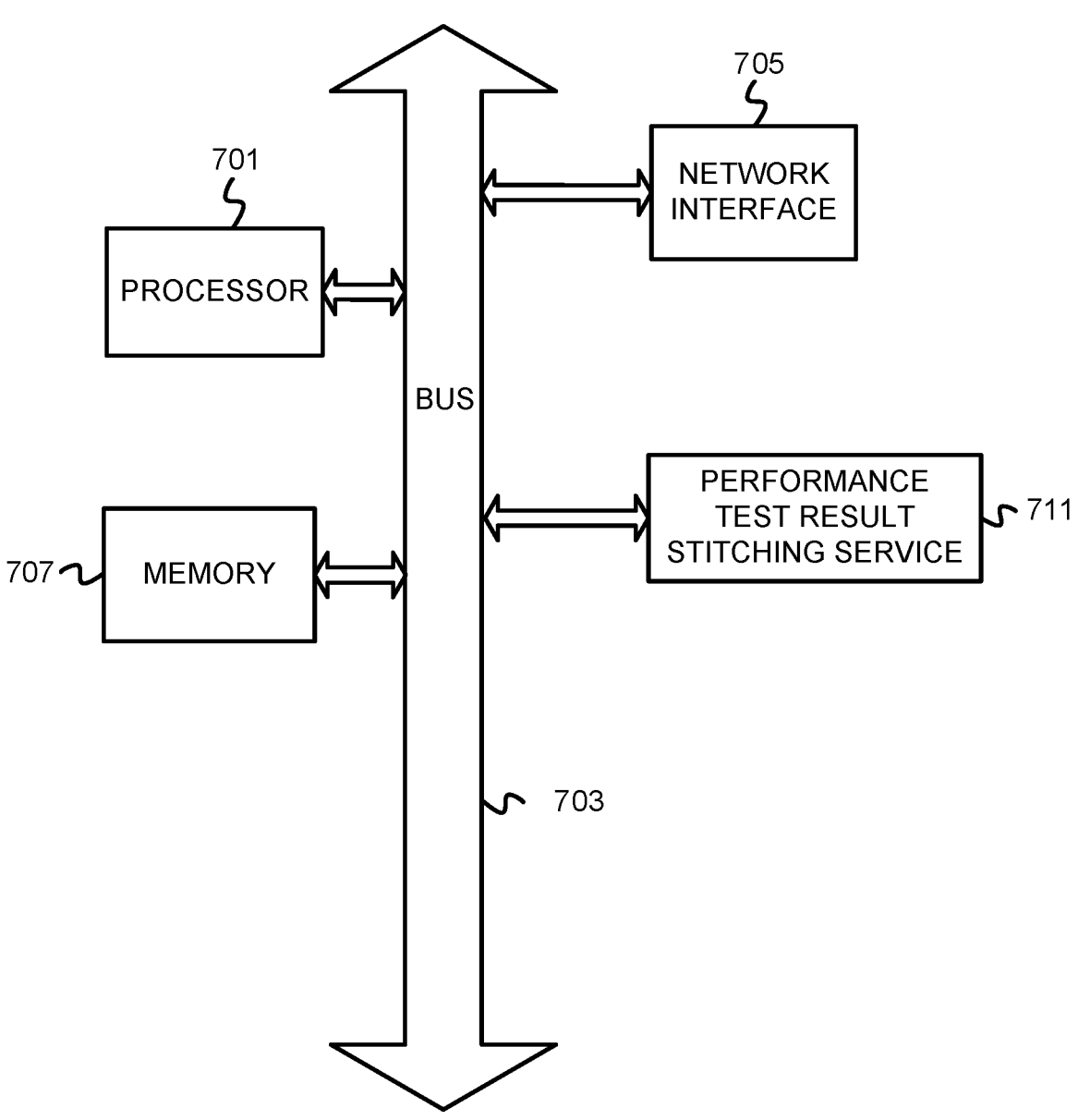
FIG. 7 depicts an example computer system with a performance test result stitching service.

FIG. 7 depicts an example computer system with a performance test result stitching service. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes performance test result stitching service 711. The performance test result stitching service 711 stitches together network and/or application testing obtained for segments of a path based on proxied testing to yield a set of test results representing the path end-to-end. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

The invention claimed is:

1. A method comprising:

obtaining, from an endpoint device, first test results generated based on testing performed for a first segment of an end-to-end path from the endpoint device to an application, wherein the first segment of the end-to-end path corresponds to a path from the endpoint device to a test proxy, wherein the test proxy comprises at least one of a network element and a security component along the end-to-end path;

obtaining, from the test proxy, second test results generated based on testing performed for a second segment of the end-to-end path from the endpoint device to the application, wherein the second segment of the end-to-end path corresponds to a path from the test proxy to the application;

generating end-to-end test results for the end-to-end path from the endpoint device to the application based on stitching together the first test results corresponding to the first segment of the end-to-end path and the second test results corresponding to the second segment of the end-to-end path, wherein stitching the first and second test results comprises at least one of combining subsets of the first and second test results and combining values indicated in the first and second test results; and indicating the end-to-end test results as results of testing performed for the end-to-end path from the endpoint device to the application.

2. The method of claim 1, wherein the first test results comprise a first path trace for the first segment of the path and the second test results comprise a second path trace for the second segment of the path, and wherein stitching together the first and second test results comprises combining the first path trace and the second path trace to generate a combined path trace for the path from the endpoint device to the application.

3. The method of claim 1, wherein the first test results comprise a first performance metric value collected for the first segment of the path and the second test results comprise a second performance metric value collected for the second segment of the path, and wherein stitching together the first and second test results comprises at least one of combining the first and second performance metric values and determining a representative one of the first and second performance metric values to generate a third performance metric value.

4. The method of claim 3, wherein the first and second performance metric values comprise a first latency measured for the first segment of the path and a second latency measured for the second segment of the path, wherein combining the first and second performance metric values comprises aggregating the first and second latencies to generate an aggregate latency, and wherein indicating the end-to-end test results comprises indicating the aggregate latency as a latency of the path from the endpoint device to the application.

5. The method of claim 3, wherein the first and second performance metric values comprise first and second jitter values, wherein combining the first and second performance metric values comprises determining a pooled standard deviation based on the first and second jitter values.

6. The method of claim 3, wherein the first and second performance metric values comprise first and second packet loss values, wherein determining the representative one of the first and second performance metric values comprises determining which of the first and second packet loss values is greater and designating the greater one of the first and second packet loss values as representative of packet loss for the path.

7. The method of claim 1, wherein the second test results comprise a latency associated with requesting a resource of the application, wherein stitching together the first and second test results comprises adjusting the latency with a delay factor determined based on at least one of the first test results and the second test results to generate an adjusted latency, and wherein indicating the end-to-end test results comprises indicating the adjusted latency as a latency associated with requesting a resource of the application from the endpoint device.

8. The method of claim 7 further comprising determining a value of the delay factor based on at least one of a first latency indicated in the first test results and a second latency indicated in the second test results, wherein adjusting the latency comprises multiplying the latency and the value of the delay factor.

9. The method of claim 1, wherein a first agent executing on the endpoint device generated the first test results for the first segment and a second agent executing on the test proxy generated the second test results for the second segment, wherein obtaining the first test results comprises obtaining the first test results from the endpoint device comprises obtaining the first test results from the first agents, and wherein obtaining the second test results from the test proxy comprises obtaining the second test results from the second agent.

10. One or more non-transitory machine-readable media having program code stored thereon, the program code comprising instructions to:

obtain, from a plurality of test sources, a plurality of first sets of results of performance testing for first paths from the plurality of test sources to a security component or a network element, wherein each of the first paths is a first segment of a path from a respective one of the plurality of test sources and an application;

obtain, from the security component or network element, a second set of results of performance testing for a second path from the security component or network element to the application, wherein the second path is a second segment of each path from one of the plurality of test sources to the application; and for each test source of the plurality of test sources and corresponding first set of results of the plurality of first sets of results, generate a set of end-to-end results from the first set of results and the second set of results based on stitching together the first set of results for a corresponding one of the first paths and the second set of results corresponding to the second path, wherein the instructions to stitch together the first and second sets of results comprise at least one of instructions to combine subsets of the first and second sets of results and instructions to combine values in the first and second sets of results; and
indicate the set of end-to-end results as results of testing performance for the path from the test source to the application.

11. The non-transitory machine-readable media of claim 10,
wherein the first set of results comprises a first performance metric value collected for a corresponding one of the first paths,
wherein the second set of results comprises a second performance metric value collected for the path from the security component or network element to the application, and
wherein the instructions to stitch together the first and second sets of results comprise instructions to combine the first performance metric value and the second performance metric value.

12. The non-transitory machine-readable media of claim 11,
wherein the first performance metric value comprises a first latency and the second performance metric value comprises a second latency, and
wherein the instructions to combine the first and second performance metric values comprise instructions to aggregate the first and second latencies to generate an aggregate latency.

13. The non-transitory machine-readable media of claim 10,
wherein the first set of results comprises a first path trace for a corresponding one of the first paths from the test source to the security component or network element,
wherein the second set of results comprises a second path trace for the path from the security component or network element to the application,
wherein the instructions to stitch together the first and second sets of results comprise instructions to combine the first path trace and the second path trace to generate a combined path trace for the path from the test source to the application.

14. A system comprising:
a processor; and
a machine-readable medium having instructions stored thereon that are executable by the processor to cause the system to,
based on testing performed for a plurality of paths from a corresponding plurality of endpoint devices to a test destination,
obtain, from the plurality of endpoint devices, a plurality of first sets of results of tests performed for a plurality of first paths from the plurality of endpoint devices to a test proxy,
wherein each of the plurality of first paths is a first segment of one of the plurality of paths from a respective one of the plurality of endpoint devices to the test proxy,
wherein the test proxy comprises a network element or a security component; and
obtain, from the test proxy, a second set of results of tests performed for a second path from the test proxy to the test destination, wherein the second path is a second segment of each of the plurality of paths; and
for each endpoint device of the plurality of endpoint devices and corresponding first set of results of the plurality of first sets of results,

stitch together the first set of results and the second set of results to generate a set of end-to-end results based on stitching together at least one of subsets of the first and second sets of results into a single set and values in the first and second sets of results into a single value; and
indicate the set of end-to-end results as results of testing network performance for a corresponding one of the plurality of paths from the endpoint device to the test destination.

15. The system of claim 14,
wherein the first set of results comprises a first performance metric value collected for a corresponding one of the plurality of first paths,
wherein the second set of results comprises a second performance metric value collected for the second path, and
wherein the instructions executable by the processor to cause the system to stitch together the first and second sets of results comprise instructions executable by the processor to cause the system to determine a third performance metric value based on the first and second performance metric values.

16. The system of claim 15,
wherein the first performance metric value comprises a first latency and the second performance metric value comprises a second latency, and
wherein the instructions executable by the processor to cause the system to determine the third performance metric value based on the first and second performance metric values comprise instructions executable by the processor to cause the system to determine an aggregate latency based on aggregation of the first and second latencies.

17. The system of claim 15,
wherein the first performance metric value comprises a first jitter value and the second performance metric value comprises a second jitter value, and
wherein the instructions executable by the processor to cause the system to determine the third performance metric value based on the first and second performance metric values comprise instructions executable by the processor to cause the system to determine a pooled standard deviation based on the first and second jitter values.

18. The system of claim 14,
wherein the second set of results comprises a latency associated with requesting a resource of the test destination, and
wherein the instructions executable by the processor to cause the system to stitch together the first and second sets of results comprise instructions executable by the processor to cause the system to adjust the latency by a delay factor having a value determined based on at least one of the first set of results and the second set of results to generate an adjusted latency.

19. The system of claim 18, further comprising instructions executable by the processor to cause the system to determine the value of the delay factor based on one or more performance metric values indicated by the first set of results, wherein the instructions executable by the processor to cause the system to adjust the latency by the delay factor comprise instructions executable by the processor to cause the system to multiply the latency and the value of the delay factor.

20. The system of claim 14, wherein the first set of results comprises a first path trace for a corresponding one of the plurality of first paths from the endpoint device to the test proxy, wherein the second set of results comprises a second path trace for the second path from the test proxy to the test destination, and wherein the instructions to stitch together the first and second sets of results comprise instructions to combine the first and second path traces to generate a path trace for the path from the endpoint device to the test destination.

* * * * *